Nov. 15, 1932.  H. L. BETTMAN  1,887,706
NONGLARING REVERSIBLE MIRROR
Filed Sept. 22, 1928   2 Sheets-Sheet 1

Inventor
Henry L. Bettman
By Thomas Bieyer
Attorney

Nov. 15, 1932.    H. L. BETTMAN    1,887,706

NONGLARING REVERSIBLE MIRROR

Filed Sept. 22, 1928    2 Sheets-Sheet 2

Inventor
Henry L. Bettman
By Thomas Bilyeu
Attorney

Patented Nov. 15, 1932

1,887,706

UNITED STATES PATENT OFFICE

HENRY L. BETTMAN, OF PORTLAND, OREGON

NONGLARING REVERSIBLE MIRROR

Application filed September 22, 1928. Serial No. 307,713.

The primary purpose and object of my device is for use as a nonglaring reversible mirror to be used upon motor driven devices such as automobiles, trucks, motor boats, aeroplanes, and the like, wherein the driver of the vehicle may view from his driving position following vehicles.

A further object of my device resides in the fact that the same is reversible and capable for use as a shield for eliminating the glare from lights on oncoming vehicles when driving at night.

A still further object of my device resides in a combination of parts that make the device automatic in its operation when headlights are turned on; the device automatically reversing itself from a bright mirror to a dark mirror when the head lights are turned on. If desired, the mirror may be manually manipulated.

The invention resides in a frame structure having disposed therein a solenoid which is used as the manipulating prime mover and having a reversible mirror associated therewith and supported by the frame so that the same may be manipulated by hand or be automatically manipulated in timed relationship with the light switches.

A further object of my device resides in means being provided to position the assembled device to meet the precise requirement of the operator of the vehicle.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

Figure 1:
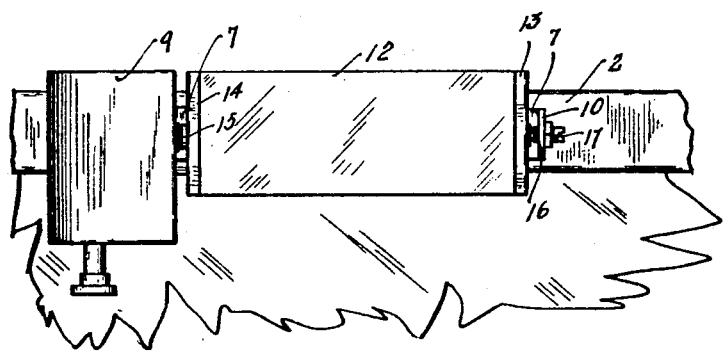
Fig. 1 is a front view of the device illustrated in position upon the windshield of a motor vehicle.
Figure 2:
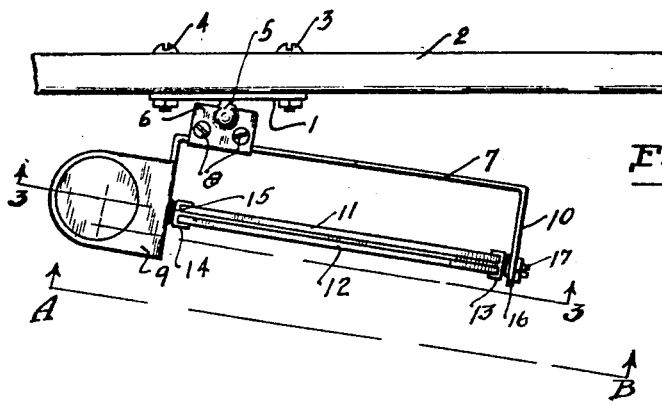
Fig. 2 is a top, plan view of the mechanism illustrated in Fig. 1.
Figure 3:
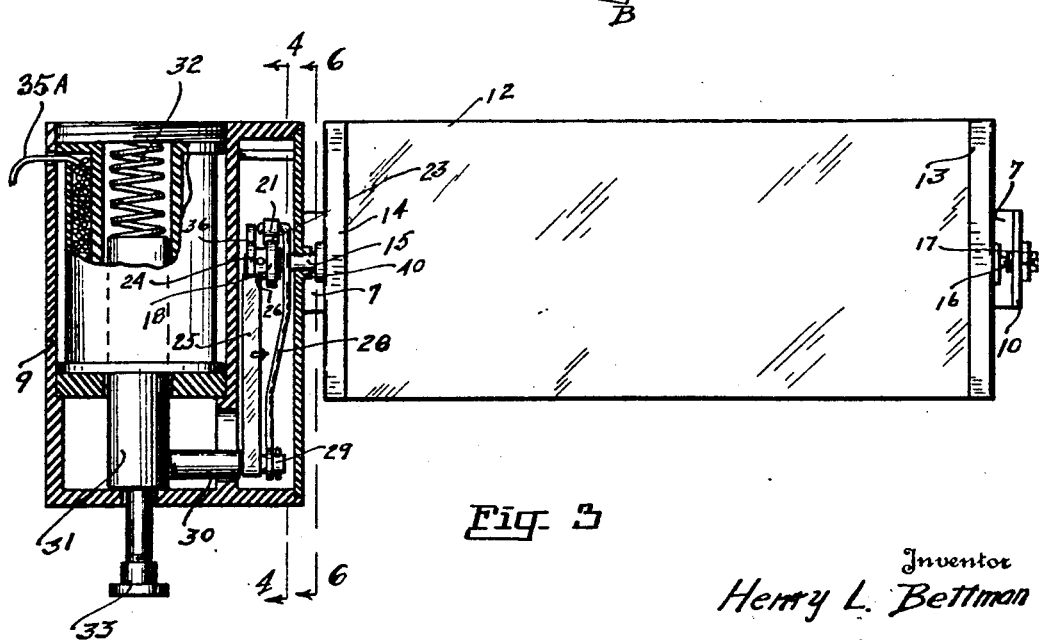
Fig. 3 is a front view of the mechanism, partially in section, the same being taken on line 3—3 of Fig. 2, looking in the direction indicated.
Figure 4:
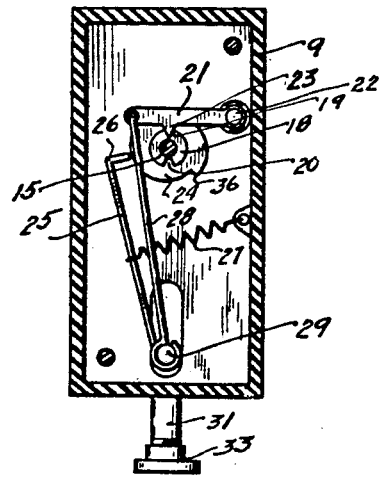
Fig. 4 is a sectional, end view, the same being taken on line 4—4 of Fig. 3, looking in the direction indicated.
Figure 5:
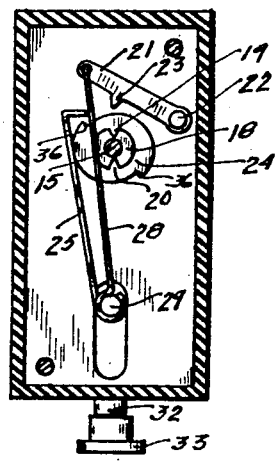
Fig. 5 is a sectional, end view, also taken on line 4—4 of Fig. 3 looking in the direction indicated and illustrating the device in position for the reversing of the mirror.
Figure 6:
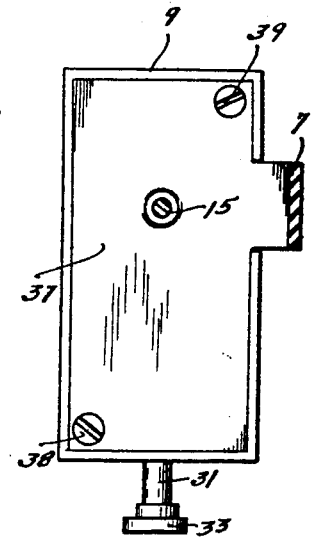
Fig. 6 is a sectional, end view, taken on line 6—6 of Fig. 3, looking in the direction indicated.
Figure 8:
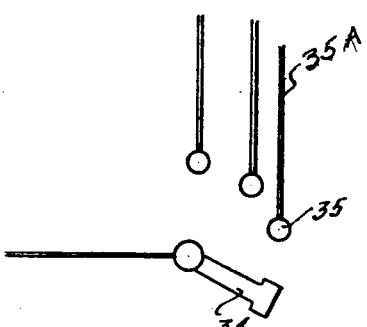
Fig. 8 is a diagrammatical lay-out of the electric switch connection illustrating more clearly the purpose of wire 35A shown in Fig. 3.
Figure 7:
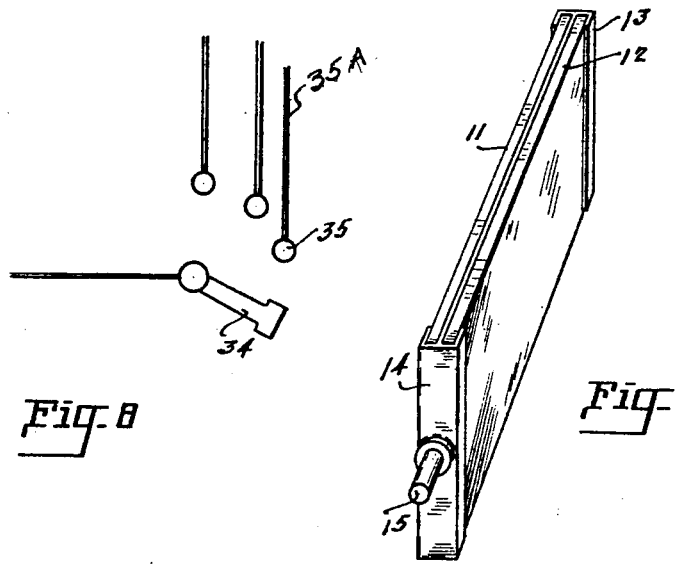
Fig. 7 is a perspective, end view of the mirror shown removed from position.

My device consists primarily of a bracket 1, adapted for engagement with the top frame 2, of a windshield of a motor vehicle or to any other supporting elements. The bracket is secured to the top frame 2 by any suitable fastening means, as by screws 3 and 4. Outwardly extending from the bracket 1, is a journal bearing 5 adapted for engagement with the clamping plates 6. The clamping plates 6 are secured to a bracket arm 7 by screws 8. The bracket arm is secured to the body element 9 upon its one end and has an inwardly extending terminal end 10 disposed upon its oppositely disposed end. The end 10 acts as the bearing for supporting the free end of the mirror. A reversible mirror is disposed within the body and bracket arm and is composed of units 11 and 12 one of which is a silvered mirror and the other of which is a black mirror, the silvered mirror being used for daylight driving to indicate to the driver of the vehicle those following the vehicle; and the black mirror being adapted for use in night driving to indicate to the operator of the vehicle that the same is being followed. The mirror eliminates the glare from headlights, or from sunlight. Mirrors 11 and 12 are secured together within a suitable frame having end walls 13 and 14. A journal bearing 15 is disposed upon one end of the mirror frame and a journal bearing 16 is disposed upon the opposite end of the mirror frame. The journal bearings of the mirror are secured rotatably within suitable supports disposed within the body element 9 and the bracket arm terminal end 10. An adjustable element 17 is disposed within the bracket arm terminal end 10 to facilitate the removal of the mirror frame from the device. A notched element 18 is disposed about journal bearing 15 having notches 19 and 20 disposed therein and upon oppositely disposed sides of the element 18. A locking arm 21 supported about a journal pin 22 has a locking lug 23 disposed upon its under side which is in registerable alignment with the notches 19 and 20 and normally rides upon the element 18. An actuator cam 24 is also disposed upon the journal shaft and has two notched surfaces disposed upon its outer surface. The actuator arm 25 has an engaging end 26 disposed thereupon which normally rides upon the outer surface of the cam 24 and intimate contact is maintained therebetween through the action of the spring 27. A link 28 connects the arm 21 with the actuator pin 29 and the free end of the actuator arm 25 normally rides upon the pin 29. The pin 29 outwardly projects from the arm 30 secured to the solenoid core 31. Solenoid core 31 being held normally depressed through the action of the compressible element 32. The solenoid core 31 may be manipulated by the push button 33; or the solenoid core may be actuated when the electric lights are turned on or off by the switch lever 34 contacting with the contact points 35 connected to cable 35A. As the lever 34 contacts with the points 35 the solenoid is energized by electric energy passing through the cable 35A connected at one end to contact point 35 and on the other end to solenoid coil 31, and in doing so the mirror is turned through one-half of a revolution. The turning is accomplished on the up stroke of the solenoid core by the releasing of the locking element 23 from the notch 19 as illustrated in Fig. 5. When the circuit is broken the compressible element 32 returns the solenoid core to its normally depressed position and in doing so the end 26 of the actuating element 25 engages the ledge 36 of the cam 24, as illustrated in Fig. 5 and the further depression of the solenoid core rotates the cam 24 and the journal shaft to which the mirrors are attached for substantially one-half of a revolution, or until the locking element 23 engages the notch 20 thereby positioning the mirror in a precise position of one-half of a revolution.

After the device has been assembled the same is made substantially dustproof by the placing of a closure plate 37 over the operating mechanism. The plate is secured to the body element 9 by any suitable fastening means as by locking screws 38 and 39. The journal shaft 15 passes through the hub 40 disposed upon the plate 37.

While the form of mechanism herein shown and described is admirably adapted to fulfill the objects primarily stated, it is to be understood that it is not intended to confine the invention to the one form of embodiment herein shown and described as it is susceptible of embodiment in various forms, all coming within the scope of the claims which follow.

What I claim is:

1. In a device of the class described, the combination of a bracket, an outwardly extending journal bearing secured to the bracket to which a clamping plate is adjustably secured, a bracket arm having an elbow at each end secured to the clamping plate, a body element, one elbow of the bracket arm secured to said body element, the other end of the bracket arm having a bearing disposed therein, a silvered and a black mirror journaled within the body element and the bearing, locking means for maintaining the mirrors in normal position and automatic means for reversing the mirrors as the head lights are turned on.

2. In a device of the class described, in combination, a reversible mirror, a mirror frame, and a casing, a notched element secured to one end of the mirror, a cam secured to the same end of the mirror, said end of the mirror being journaled within the casing, a solenoid vertically disposed within the casing, an arm horizontally disposed near the lower end of the solenoid and carried by the armature thereof, a locking arm hingedly disposed within the casing, a lug disposed upon the under side of the locking arm in registerable alignment with the notched element, a link secured to the free end of the locking arm and to the horizontally disposed arm, an arm extending upwardly from the horizontally disposed arm and having an engaging end in registerable alignment with the cam disposed upon the mirror, a compressible element disposed above the solenoid armature and within the casing, automatic means for energizing the solenoid, and manual actuating means disposed within and outwardly extending from the casing for manually actuating the solenoid armature.

3. In a device of the class described, the combination with a frame, a mirror pivotally disposed within the frame, a casing secured to the frame, one end of said mirror being journaled within the casing, a solenoid vertically disposed within the casing, an arm horizontally disposed relative to the solenoid and carried by the armature shaft thereof, a locking arm hingedly disposed within the casing, a link secured to the free end of the locking arm and to the horizontally disposed arm, an arm extending upwardly from the horizontally disposed arm, a compressible element disposed above the solenoid armature, means for energizing the solenoid, and manual means disposed within and outwardly extending from the casing adapted for manually actuating the solenoid armature.

HENRY L. BETTMAN.